No. 752,505. PATENTED FEB. 16, 1904.
H. J. ARNETT.
COTTON PACKER.
APPLICATION FILED OCT. 17, 1902.
NO MODEL.

Witnesses
E. F. McKee
B. P. Funk

Inventor
Henry J. Arnett
By Victor J. Evans
Attorney

No. 752,505. Patented February 16, 1904.

UNITED STATES PATENT OFFICE.

HENRY J. ARNETT, OF PONTOTOC, INDIAN TERRITORY.

COTTON-PACKER.

SPECIFICATION forming part of Letters Patent No. 752,505, dated February 16, 1904.

Application filed October 17, 1902. Serial No. 127,656. (No model.)

*To all whom it may concern:*

Be it known that I, HENRY J. ARNETT, a citizen of the United States, residing at Pontotoc, Chickasaw Nation, Indian Territory, have invented new and useful Improvements in Cotton-Packers, of which the following is a specification.

This invention relates to a cotton-packer; and the object thereof is to provide a mechanical device which will effectually force the cotton or other material into a hopper, from where it will be conveyed to its destination. The invention is also applicable to use for forcing the cotton into a hopper of a baling-press.

In order to understand the operation of the device and its construction, reference should be had to the accompanying drawings, in which—

Figure 1:
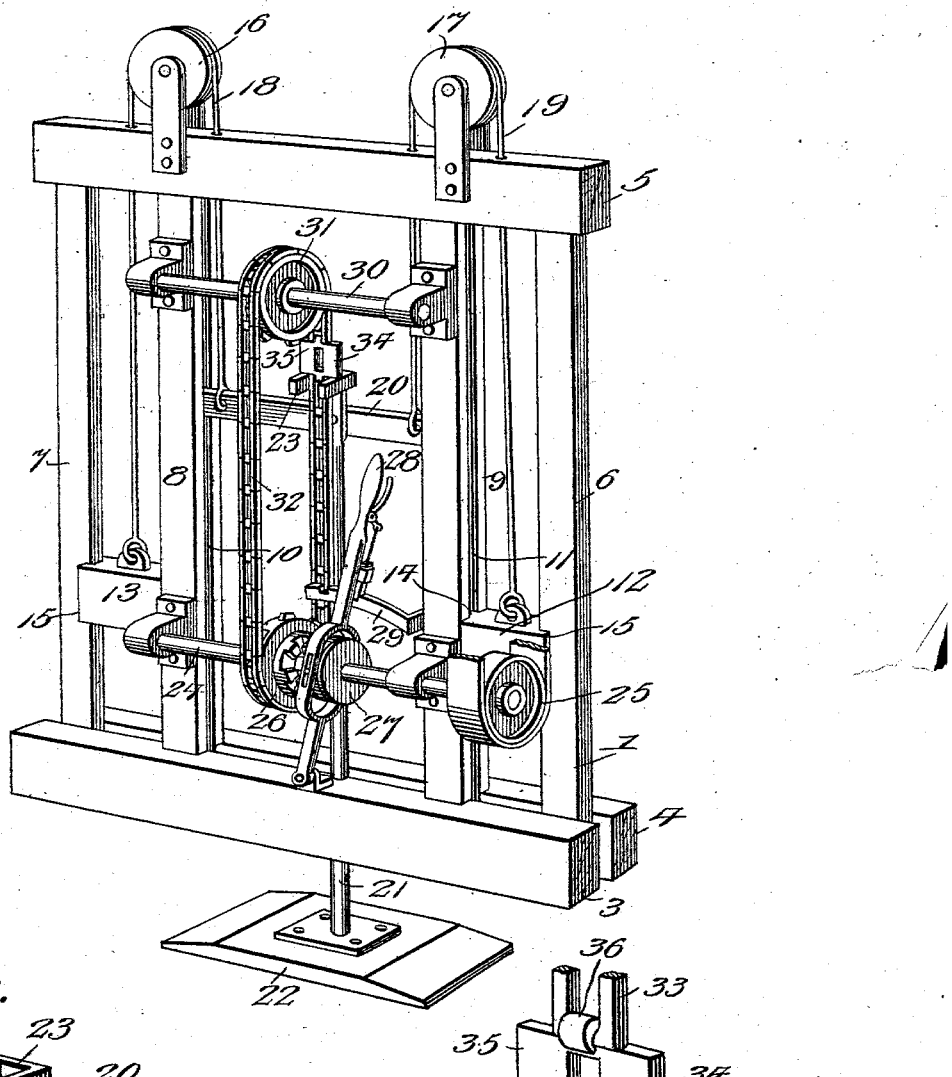
Figure 2:
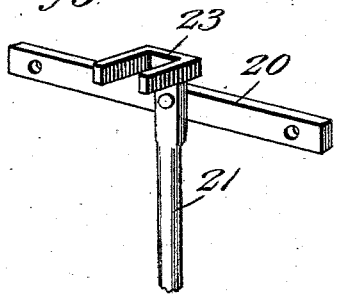
Figure 3:
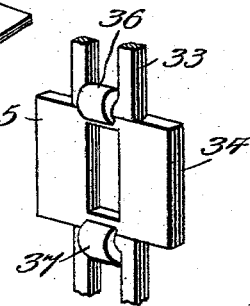

Figure 1 is a perspective view of a machine constructed in accordance with my invention. Fig. 2 is a detail perspective view of a portion of the plunger-pitman. Fig. 3 is a rear perspective view of the trip-link for actuating the pitman.

The reference-numeral 1 designates a suitable frame comprising two horizontally-arranged parallel beams 3 and 4, spaced apart and connected to a top beam 5 by vertical standards 6 and 7. Intermediate the standards 6 and 7 are vertical guide-beams 8 and 9, respectively. On the opposite vertical edges of each of the beams 8 and 9 are longitudinally-arranged grooves 10 and 11. Arranged between each pair of standards 6 and 7 and beams 8 and 9 are vertically-moving weights 12 and 13, on one end of each of which is a rib 14, which works in one of the grooves 11, and on the other end of the weights are parallel flanges 15, which embrace the sides of the standards 6 and 7, so that the weights will be suitably guided with relation to the frame. Arranged in suitable bearings on the top of the frame and supported by the beam 5 are pulleys 16 and 17, over which pass cords 18 and 19, connected at one of their ends to the weights and at their other ends to the ends of a horizontal guide-bar 20, working in the grooves 10 of the beams 8 and 9, said cords being guided in vertical openings therefor in the top beam 5, as shown. This guide-bar carries a vertically-arranged pitman or plunger-rod 21, which projects between the base-beams 3 and 4 and carries on its lower extremity a packer-head or follower 22. From the top of the plunger rod or pitman 21 is a U-shaped trip 23, having two parallel arms connected at their rear ends by a plate or bar and formed integral with the plunger-rod 21. A shaft 24 is journaled near the lower extremity of the frame and is supported by the beams 8 and 9, said shaft being driven by a belt-pulley 25. A sprocket-wheel 26 is carried by the shaft and is designed to be thrown into and out of operative relation therewith by means of a clutch mechanism 27 of any preferred construction and provided with a handle 28, designed to engage the teeth in the rack 29, carried by the beam 9. Alining with this sprocket-wheel and secured to a shaft 30 near the upper end of the frame is a second sprocket-wheel 31, to be engaged by a chain 32, which passes over the sprocket-wheel and carries a trip-link 33, having oppositely-disposed lateral projections 34 and 35. As the shaft 24 is driven by the pulley 25 and the sprocket-wheel 26 rotated thereby, motion will be imparted to the chain 32, and as it passes over the sprocket-wheel it will carry the trip-link 33, so as to cause it to engage with the trip 23 from the top, forcing the plunger down its full stroke. As the trip reaches a point opposite the sprocket-wheel 26 it will leave the link, releasing the plunger-rod, which will be retracted by means of the weights through the medium of the cords or cables 18 and 19, which are connected to the guide-bar 20. This operation will successively take place as the shaft 24 is rotated; but the mechanism can be immediately thrown out of gear by releasing the clutch 27 through the medium of the handle-lever 28.

It will be seen that a packing device constructed in accordance with my invention will pack the material into the hopper mechanically without manual aid and that it can be stopped at convenient times without affecting the operation of the motor which drives it.

Having thus described the invention, what is claimed as new, and desired to be secured by Letters Patent, is—

1. In a packer for cotton and other materials, the combination of a supporting-frame, constructed of lower duplicate horizontal beams, spaced apart and having secured therebetween the lower ends of duplicate standards, duplicate guide-beams located intermediate of and at suitable distances from the standards, and also having their lower ends secured to the horizontal beams, the said standards and guide-beams being connected at their upper ends by a top beam, the latter having duplicate guide-pulleys mounted thereon, a plunger having a rod working between the horizontal beams, means for operating said plunger, comprising a coöperating trip and trip-link, and weights for retracting the plunger constructed to move between the pairs of standards and guide-beams aforesaid, and having operating-cords connected at one of their ends to said weights, thence passing over the said guide-pulleys and having the other ends thereof secured to a part of the operating means for the plunger.

2. In a packer for cotton and other materials, the combination of a supporting-frame, comprising lower duplicate horizontal beams, spaced apart and having secured therebetween the lower ends of duplicate standards, duplicate vertical guide-beams located intermediate of and at suitable distances from the standards, and also having their lower ends secured to the horizontal beams, the said standards and guide-beams being connected at their upper ends by a top beam, having duplicate guide-pulleys thereon and provided with duplicate openings, each coinciding with a vertical plane passing between each pair of standards and guide-beams aforesaid, the said guide-beams each being formed in each of its edges with a groove, a plunger having a rod working between said horizontal beams and provided at its upper end with a trip having a horizontal member working in adjacent grooves of the guide-beams, means mounted on faces of the guide-beams for operating the plunger, said means including a trip-link coöperating with the trip aforesaid, retracting-weights for the plunger constructed on their inner edges to work in the outer grooves of the guide-beams, and having their outer edges moving upon the said standards, and operating-cords for said weights passing over the guide-pulleys and through the openings in the top beam and connected to the said horizontal member of the trip.

3. In a packer for cotton and other materials, the combination of a supporting-frame, comprising lower duplicate horizontal beams, spaced apart and having secured therebetween the lower ends of duplicate standards, duplicate vertical guide-beams located intermediate of and at suitable distances from the standards, and also having their lower ends secured to the horizontal beams, the said standards and guide-beams being connected at their upper ends by a top beam, having duplicate guide-pulleys mounted thereon and provided with duplicate openings each coinciding with a vertical plane passing between each pair of the standards and guide-beams aforesaid, the said guide-beams each being formed in each of its edges with a groove, a plunger having a rod working between said horizontal beams and provided at its upper end with a trip having a horizontal member working in adjacent grooves of the guide-beams, means mounted on faces of the guide-beams for operating the plunger, said means including a trip-link coöperating with the trip aforesaid, retracting-weights for the plunger constructed on their inner edges to work in the outer grooves of the guide-beams, and having their outer edges moving upon the said standards, operating-cords for said weights passing over the guide-pulleys and through the openings in the top beam and connected to the said horizontal member of the trip, and clutch devices for throwing the operating means for the plunger into and out of engagement.

4. In a packer for cotton and other materials, the combination of a supporting-frame, comprising lower duplicate horizontal beams, spaced apart and having secured therebetween the lower ends of duplicate standards, duplicate vertical guide-beams located intermediate of and at suitable distances from the standards, and also having their lower ends secured to the horizontal beams, the said standards and guide-beams being connected at their upper ends by a top beam having duplicate guide-pulleys mounted thereon and provided with duplicate openings each coinciding with a vertical plane passing between each pair of the standards and guide-beams aforesaid, the said guide-beams each being formed in each of its edges with a groove, a plunger having a rod working between said horizontal beams and provided at its upper end with a trip having a horizontal member working in adjacent grooves of the guide-beams, means mounted on faces of the guide-beams for operating the plunger, said means including a trip-link coöperating with the trip aforesaid, retracting-weights for the plunger constructed on their inner edges to work in the outer grooves of the guide-beams, and having their outer edges moving upon the said standards, and operating-cords for said weights passing over the guide-pulleys and through the openings in the top beam and connected to the said horizontal member of the trip, the said trip being constituted of parallel members connected at one of their ends by a plate, and the said trip-link being formed with lateral projections for engagement with said members.

In testimony whereof I affix my signature in presence of two witnesses.

HENRY J. ARNETT.

Witnesses:
T. A. WORLEY,
J. G. ALLEN.